Figure 1:
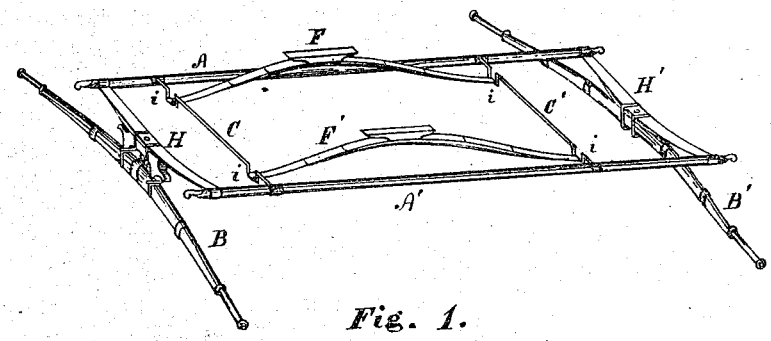

C. A. COLLINS.
Side-Bar Wagon.

No. 159,392.                                   Patented Feb. 2, 1875.

Witnesses.                                     Inventor.
Geo. M. Wright                                 Charles A. Collins
Thomas Kinsman                                 by Humphrey & Stuart
                                               his attorneys

UNITED STATES PATENT OFFICE.

CHARLES A. COLLINS, OF AKRON, OHIO.

IMPROVEMENT IN SIDE-BAR WAGONS.

Specification forming part of Letters Patent No. 159,392, dated February 2, 1875; application filed December 18, 1874.

*To all whom it may concern:*

Be it known that I, CHARLES A. COLLINS, of Akron, in the county of Summit and State of Ohio, have invented an Improved Method of Hanging Half-Spring Side-Bar Wagons, of which the following is a specification:

This invention relates to that class of vehicles in which side bars are connected at their ends to springs carried by the front and rear axles, said side bars being provided with depending hangers, to which the ends of side springs, which carry the body of the vehicle, are attached.

My invention has for its object to strengthen such class of vehicles, and render them more effective in operation; and to this end it consists in connecting the side bars together by oscillating transverse bars having cranks, to which the ends of the side springs which carry the body of the vehicle, are attached. With the above are combined end springs, supported on the front and rear axles, as will be hereinafter described, reference being had to the accompanying drawing, in which the figure illustrates a perspective view of my invention.

A A' are two side bars or spars, supported at their ends upon the extremities of the half-elliptic end springs H H', which latter are fastened to the bolster of the front axle, B, and the rear axle, B', respectively. The half-elliptic side springs F F' support the body of vehicle, and rest upon the connecting-rods C C', in the manner hereinafter described. These rods C C' are carefully journaled in metallic bearings in, or attached to, the spars A A', near the ends thereof, so as to freely revolve therein, and at the points *i i* are bent or otherwise constructed, so as to form cranks and wrists, the cranks of each rod being at right angles therewith, and in the same plane. These rods are of sufficient strength to resist breaking or twisting, from uneven pressure applied to the cranks on the opposite ends thereof. The ends of the side springs F F' are arranged to rest upon and grasp, with properly-constructed boxes, the wrists of the cranks *i i*, so that the depression of either of said springs will, by the elongation consequent thereon, cause a partial rotation of the rods C C', and thereby produce a corresponding depression of the other spring.

By this arrangement the two springs F F' vibrate in unison, and their depression is alike, without regard to whether the pressure be applied to one or both.

The objects I seek to attain by my invention are, to retain the combined effects of the end and side half-elliptic springs, while avoiding the side motion and tipping of the vehicle usually incident to side springs when not arranged with the connecting-rods and cranks, as herein shown, and also to secure the ease of a full elliptic spring, and at the same time permit the body to be hung lower than such springs would permit.

I am aware that it is not new to use connecting-rods and cranks substantially like those herein described, for the purpose of equalizing the motion of side springs, the patent issued to John A. Topliff and George H. Ely, April 9, 1872, No. 4,859, describing a device of that nature, and referring to other instances of a similar use; but in each of these cases no side bars and end springs are used, but the rods are attached directly to the front bolster and rear axle, and herein they differ materially from my invention. Nor is it new to combine spars supported on end springs with side springs resting upon rods passing transversely between the spars, as such an arrangement is described in a patent issued to J. W. Gosling, March 3, 1874; but in this patent no crank-rods are used or claimed to equalize the depression of the springs or prevent side motion to the body, which is one of the essential features of my invention.

Having thus described my invention, and set forth wherein it differs from former inventions, I claim—

The combination, with the rigid side rails A A', connected at their ends to the end springs H H', carried by the axles of the transverse rods C C', having the cranks *i i*, and journaled in the side rails for connecting the latter together, and the side springs F F', connected at each end to the cranks *i* of the connecting-rods, all substantially as shown and described.

CHARLES A. COLLINS.

Witnesses:
JOHN H. CAMPBELL,
J. A. KOHLER.